US011150807B2

United States Patent
Krishnamurthy et al.

(10) Patent No.: US 11,150,807 B2
(45) Date of Patent: Oct. 19, 2021

(54) DYNAMIC STORAGE SYSTEM CONFIGURATION

(71) Applicant: Avago Technologies International Sales PTE. Limited, Singapore (SG)

(72) Inventors: Naveen Krishnamurthy, Bangalore (IN); Sridhar Rao Veerla, Bangalore (IN); Basavaraj G. Hallyal, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 727 days.

(21) Appl. No.: 14/628,700

(22) Filed: Feb. 23, 2015

(65) Prior Publication Data
US 2016/0246501 A1     Aug. 25, 2016

(51) Int. Cl.
*G06F 12/00*     (2006.01)
*G06F 3/06*     (2006.01)

(52) U.S. Cl.
CPC ............ *G06F 3/061* (2013.01); *G06F 3/0605* (2013.01); *G06F 3/0619* (2013.01); *G06F 3/0631* (2013.01); *G06F 3/0644* (2013.01); *G06F 3/0647* (2013.01); *G06F 3/0689* (2013.01)

(58) Field of Classification Search
CPC ...... G06F 3/061; G06F 3/0647; G06F 3/0605; G06F 3/0619; G06F 3/0631; G06F 3/0644; G06F 3/0689
See application file for complete search history.

(56) References Cited

U.S. PATENT DOCUMENTS

| | | | |
|---|---|---|---|
| 6,658,526 B2 * | 12/2003 | Nguyen | G06F 3/0613 711/111 |
| 8,341,503 B1 | 12/2012 | Yoon et al. | |
| 8,555,021 B1 | 10/2013 | Barturen | |
| 8,589,626 B2 | 11/2013 | Cho | |
| 8,650,360 B2 | 2/2014 | Ishizaki et al. | |
| 2008/0168224 A1 * | 7/2008 | Davison | G06F 11/2058 711/114 |
| 2009/0055451 A1 * | 2/2009 | Reimer | G06F 11/1076 |

(Continued)

FOREIGN PATENT DOCUMENTS

JP    WO 2015015550 A1 *   2/2015  ......... G06F 12/0866

*Primary Examiner* — Gurtej Bansal
*Assistant Examiner* — Mehdi Namazi
(74) *Attorney, Agent, or Firm* — Morgan, Lewis & Bockius LLP (57) ABSTRACT

Embodiments herein provide for dynamic storage system configuration. In one embodiment, a storage controller is operable to configure a storage volume from a plurality of storage devices. The storage controller includes an interface operable to receive a first write I/O request from a host system, and to extract a storage configuration attribute from the first write I/O request. The storage controller also includes a processor communicatively coupled to the interface and operable to identify a storage configuration required by the first write I/O request based on the storage configuration attribute, to determine whether the storage volume comprises the required storage configuration of the first write I/O request, and to configure a portion of the storage volume according to the storage configuration required by the first write I/O request in response to a determination that the storage volume does not comprise the required storage configuration.

20 Claims, 7 Drawing Sheets

(56) References Cited

U.S. PATENT DOCUMENTS

2010/0131728 A1* 5/2010 Miyamae .............. G06F 3/0605
711/162
2012/0173594 A1* 7/2012 Jogand-Coulomb .......................
G06F 17/30147
707/812

* cited by examiner

DYNAMIC STORAGE SYSTEM CONFIGURATION

FIELD OF THE INVENTION

The invention generally relates to storage system configuration.

BACKGROUND

Data storage systems exist in a many forms varying in complexity and size. Larger storage systems often employ many storage devices, such as hard disk drives (HDDs) and solid state drives (SSDs) that may be presented to a host system through a storage controller to perform Input/Output (I/O) operations to the storage devices. The host system then configures the storage system to operate under a desired storage management technique. For example, a host system, through a Redundant Array of Independent Disks (RAID) storage controller, may configure multiple HDDs to operate in conjunction via a particular RAID management technique for preventing the loss of data in the event of a failure of one or more of the HDDs. However, these preconfigured and static storage designs require implementation at the system administrator level and are quite inflexible. And, I/O operations directed to such as storage system by default inherit the properties of the storage system.

SUMMARY

Systems and methods herein provide for dynamic storage system configuration and sophisticated I/O handling via storage configuration attributes available in the I/O itself. In one embodiment, a storage controller is operable to configure a storage volume from a plurality of storage devices. The storage controller includes an interface operable to receive a first write I/O request from a host system, and to extract a storage configuration attribute from the first write I/O request. The storage controller also includes a processor communicatively coupled to the interface and operable to identify a storage configuration required by the first write I/O request based on the storage configuration attribute, to determine whether the storage volume comprises the required storage configuration of the first write I/O request, and to configure a portion of the storage volume according to the storage configuration required by the first write I/O request in response to a determination that the storage volume does not comprise the required storage configuration.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
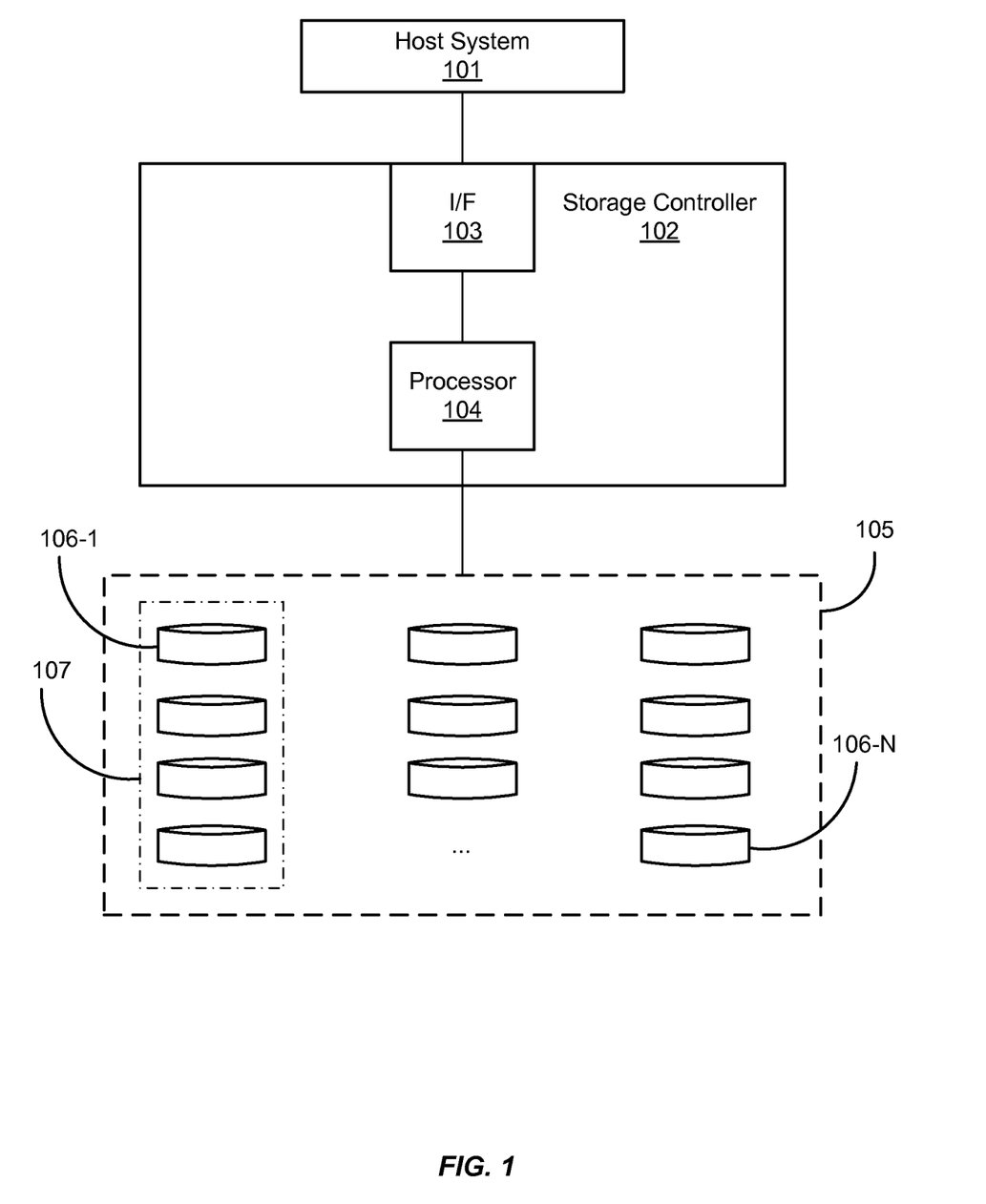
FIG. 1 is a block diagram of an exemplary storage controller coupled to a plurality of storage devices.

FIG. 1 is a block diagram of an exemplary storage controller 102 coupled to a plurality of storage devices 106-1-106-N (where "N" represents an integer greater than "1" and not necessarily equal to any other "N" reference number herein). The storage controller 102 is operable to control storage operations, such as reading and writing, to the storage devices 106 at the behest of the host system 101. The storage controller 102 aggregates the storage capabilities of the storage devices 106 such that the storage devices 106 appear as a single "logical volume" 105 of storage space to the host system 101. In this regard, the storage controller 102 is any device, system, software, or combination thereof operable to present a plurality of storage devices 106 as a logical volume to the host system 101. It should be understood, however, that the storage controller 102 may also be operable to create multiple logical volumes 105 from the storage devices 106.

The storage controller 102 includes an interface 103 that is operable to receive I/O requests from the host system 101 and to perform initial processing on the I/O requests. For example, the interface 103 may detect certain information or storage configuration "attributes" that are used to direct I/O processing. In this regard, the storage controller 102 also includes a processor 104 that uses these attributes to control how the I/O requests are processed and subsequently routed to the storage devices 106.

In some instances, these attributes are used to configure special storage requirements of the I/O request. For example, the host system 101 may issue a write I/O request to the storage volume 105 that requires a certain level of data security, such as a RAID level 6 storage management technique. The processor 104 determines whether the storage volume 105 presently comprises any RAID level 6 management capability among its storage devices 106. If the storage volume 105 does not, then the processor 104 configures a RAID level 6 management among a portion of the storage devices 106 as exemplarily illustrated with the "sub-volume" 107. If the sub-volume 107 already exists, then the processor 104 directs the I/O request to that sub-volume. In other words, the processor 104 is operable to provide a storage volume 105 with flexible storage configurations that are dependent on the I/O requests themselves and are substantially transparent to the host system 101. Thus, host system/system administrator level storage configurations are no longer necessary.

Additionally, the storage controller 102 is operable to reconfigure existing storage configurations as needed. For example, the storage controller 102 may routinely identify sub-volumes 107 that are no longer occupied with data. The storage controller 102 would then reclaim the storage capacity of that sub-volume 107 for subsequent I/O requests with new storage configuration attributes.

The storage devices 106 may be any combination of HDDs, SSDs and Secure Enabled Drives (SEDs). And, the storage configurations based on the attributes of the I/O requests may be varied as a matter of design choice. For example, the storage configuration attributes may direct the processor 104 to implement any level of RAID storage management, I/O caching, I/O duplication, atomic I/O operations, media preferences (e.g., HDD, SSD, or SED), or the like. Generally, the storage attributes associated with the I/O requests are implemented through a driver resident within the host system 101, described in greater detail below.

Figure 2:
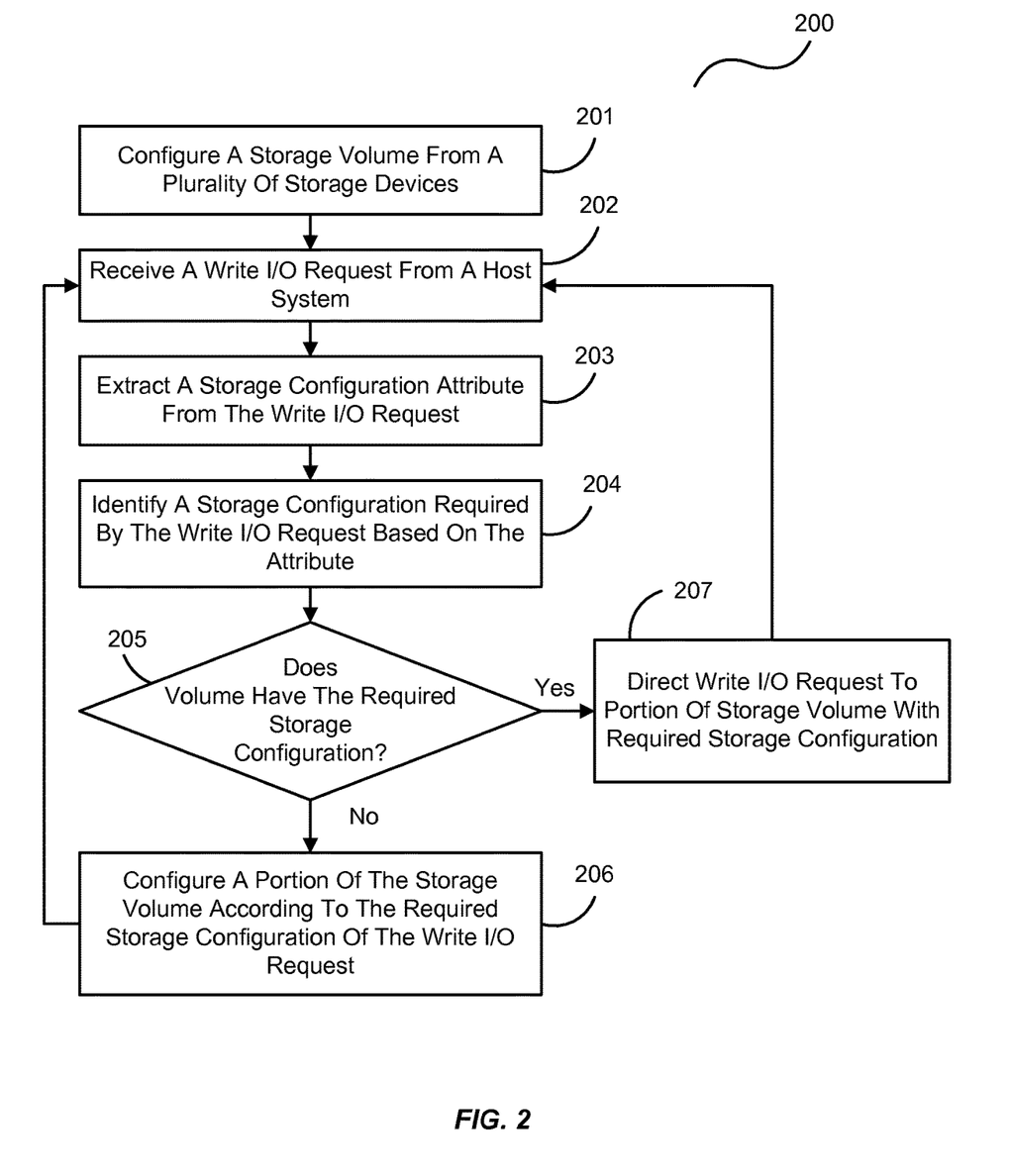
FIG. 2 is a flowchart of an exemplary process of the storage controller of FIG. 1.

FIG. 2 is a flowchart of an exemplary process 200 of the storage controller 102 of FIG. 1. In this embodiment, the storage controller 102 configures a storage volume from a plurality of storage devices 106-1-106-N, in the process element 201, as mentioned above. Once configured, the storage controller 102 can begin processing I/O requests from the host system 101. The interface 103 in this regard receives a write I/O request from the host system 101, in the process element 202. And, the interface 103 extracts a storage configuration attribute from the write I/O request, in the process on the 203.

The processor 104 uses the storage configuration attribute to identify a storage configuration required by the write I/O request, in the process element 204. The processor 104 then determines whether the storage volume 105 has the storage configuration required by the write I/O request, in the process element 205. If the storage volume 105 does possess the storage configuration required by the write I/O request, then the processor 104 directs the data of the write I/O request to that portion of the storage volume 105 for storage among the storage devices 106. The process 200 then returns to the process element 202 to continue processing I/O requests from the host system 101.

If, however, the storage volume 105 does not possess the storage configuration required by the write I/O request, then the processor 104 uses the extracted storage configuration attribute from the write I/O request to configure a portion of the storage volume 105 according to the required storage configuration of the write I/O request, in the process element 206. The process 200 then returns to resume processing I/O requests, in the process element 202.

Although shown and described with respect to a write I/O request, the invention is not intended to be limited to such. The storage controller 102 can process read I/O requests as well. One skilled in the art should readily recognize, however, that storage attributes of read I/O requests are not likely be used to configure storage configurations because the data of the I/O request should already exist in the storage volume 105. That is, storage configuration of the storage volume 105 would not likely be needed if the data of a particular request is already being stored in the storage volume 105. Thus, storage attributes associated with read I/O requests would be used by the processor 104 to assist in identification and mapping of the read I/O requests to the various storage devices 106 of the storage volume 105.

Figure 3:
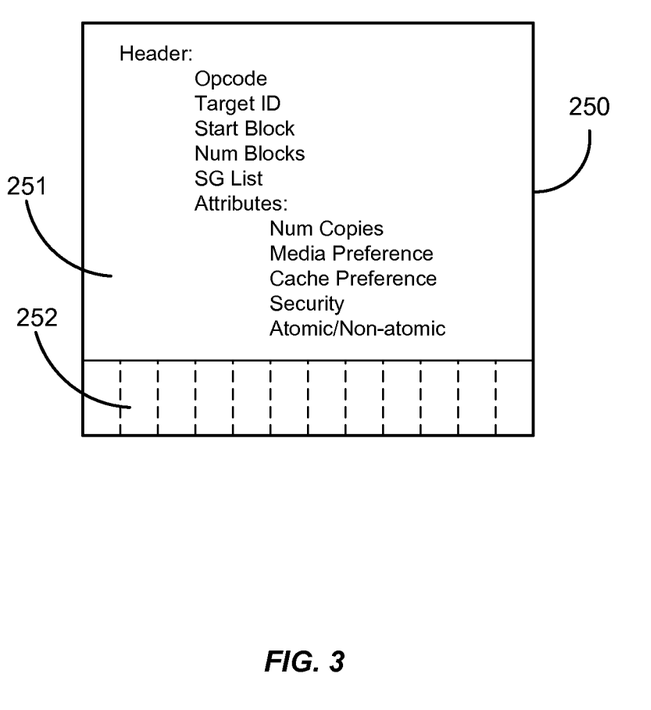
FIG. 3 is a block diagram of an exemplary I/O request generated by a host system.

FIG. 3 is a block diagram of an exemplary write I/O request 250 generated by the host system 101. As mentioned, when the host system 101 issues an I/O request to the storage controller 102, the host system 101 associates storage configuration attributes with the I/O request that are used by the storage controller 102 to configure portions of the storage volume 105 according to the attributes or to identify presently configured portions of the storage volume 105 and direct the I/O request thereto.

The write I/O request 250 has certain information that is commonly associated with I/O requests being issued from a host system, including opcodes, target IDs, start blocks, a number of blocks of data 252, and a scatter gather list used for memory addressing of the storage devices 106. The write I/O request 250, in this embodiment however, also has storage configuration attributes that are operable to direct the storage controller 102 to dynamically implement various storage configurations required by different types of I/O requests.

For example, flexible storage configuration of the storage volume 105 allows the storage volume 105 to serve I/O requests from a variety of different data systems. I/O requests relating to consumer movie purchases requiring relatively large amounts of data storage may be implemented on HDDs where storage is relatively inexpensive. Where faster access is required, I/O requests may be directed to SSDs. And, some I/O requests may require substantial redundancy and RAID level protection whereas I/O requests from other data systems may not requires as much data protection.

Whatever the case, the write I/O request 250 is operable to direct the storage controller 102 to provide dynamic storage configuration from a larger storage volume 105 configured from a plurality of storage devices 106. Some of the exemplary attributes illustrated herein regard the number of copies required of the I/O request, the media preference (e.g., HDD, SSD, or SED), whether caching is desired, the type of data protection required (e.g., RAID level type), and whether the I/O request is to be processed as an atomic I/O operation.

Figure 4:
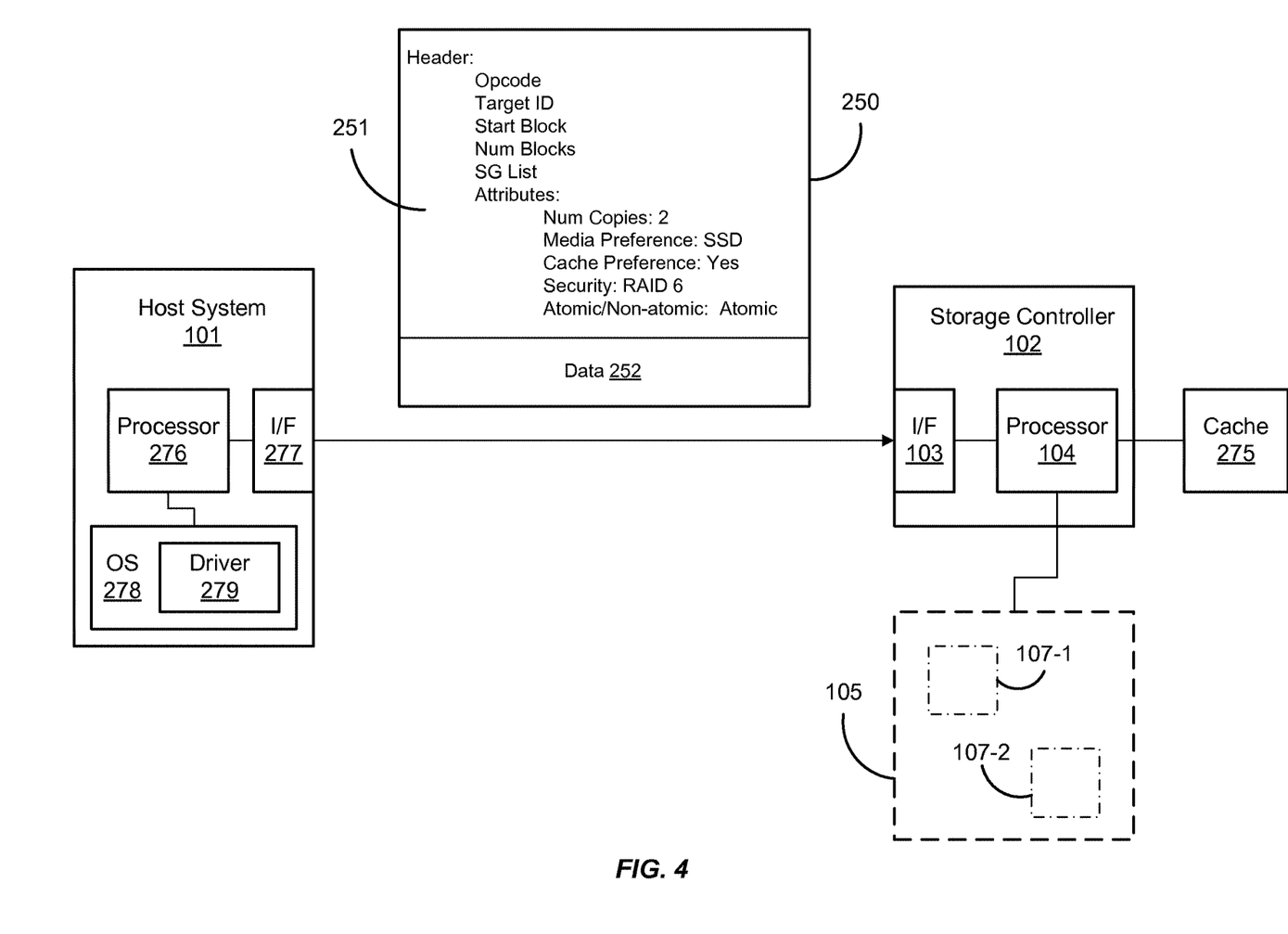
FIG. 4 is a block diagram of an exemplary I/O request being issued by a host system and processed by the storage controller of FIG. 1.

FIG. 4 is a block diagram of an exemplary I/O request being issued by the host system 101 and processed by the storage controller 102. As mentioned, the host system 101 may be configured with a driver 279 that is operable to issue I/O requests to the storage controller 102 in a format recognized by the storage controller 102. Examples of such formats include the Peripheral Computer Interface Express (PCIe) protocol, the Serial Attached Small Computer System Interface (SAS) protocol, Small Computer System Interface (SCSI) protocol, Serial ATA (SATA), and the like.

The host system 101 typically includes a processor 276 and some sort of interface 277 operable to communicate with the storage controller 102 (e.g., via one of the various protocols mentioned above). And, the host system 101 also typically includes an operating system (OS) 278 where the driver 279 may reside. As the storage controller 102 is operable to dynamically configure the storage volume 105 based on various types of I/O requested from the host system 101, the host system 101 itself can be flexible in nature. For example, the host system 101 may be representative of a computer server or other network element that interfaces with a variety of data systems requiring data storage.

In whatever configuration, the host system 101, via the driver 279, issues the write I/O request 250 to the storage controller 102 to perform a write I/O operation to the storage volume 105. The interface 103 parses out the attributes from the header portion 251 of the write I/O request 250 to direct the processor 104 to identify how and where the data 252 of the write I/O request 250 is to be stored. Again, if the storage configuration is not present within the storage volume 105, the processor 104 will configure a sub-volume 107 within the storage volume 105. Otherwise, the processor 104 will use the attributes to store the data 252 of the write I/O request 250 in the appropriate sub-volume 107 or other portion of the storage volume 105.

To illustrate, the storage configuration attributes of the write I/O request 250 in this embodiment include storing two copies of the data 252 in the storage volume 105. The storage configuration attributes also include a media preference of SSD storage and caching of the I/O request. The storage configuration attributes also direct the processor 104 to implement RAID level 6 storage and atomic I/O operations.

In this example, such a storage configuration does not exist presently within the storage volume 105. Accordingly, the processor 104 creates two RAID level 6 sub-volumes 107-1 and 107-2 from SSDs residing in the storage volume 105, thereby providing duplicated RAID level 6 protection within the storage volume 105. Once sub-volumes 107-1 and 107-2 are created from the portions of the storage volume 105, the storage controller 102 calculates the parity required of the RAID level 6 protection for the data 252 of the I/O requests and stores the data 252 in the sub-volumes 107-1 and 107-2. The storage controller 102, as required by the storage configuration attributes, also caches the write I/O request 250 in a cache module 275.

It should be noted that the storage volume 105 can be configured from any combination of storage devices 106 and is not intended to be limited to any particular type of storage device. For example, the storage volume 105 can be exclusively configured from HDDs, SSDs, or the like. Or, the storage volume can be configured from a combination of HDDs, SSDs, SEDs, and any other type of storage device that is available. It should also be noted that the cache module 275 may be external to the storage controller 102 or resident within the storage controller 102. Alternatively or additionally, a portion of the storage devices 106 of the storage volume 105 may be configured for providing the caching module 275. In any case, the storage volume 105 is presented a volume of storage to the host system 101 and the storage controller 102 is operable to implement storage configurations based on I/O requests.

Figure 5:
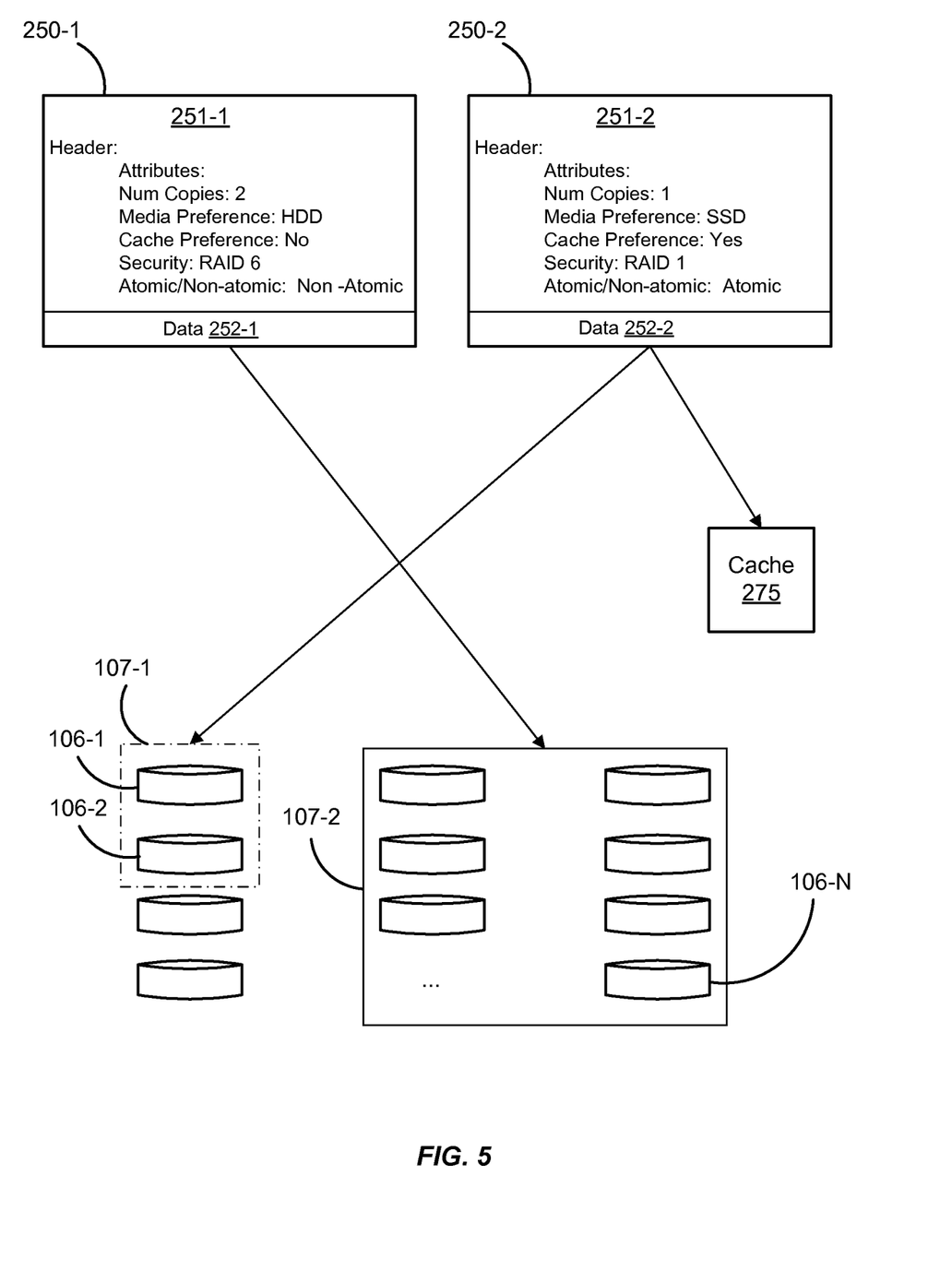
FIGS. 5 and 6 are block diagrams that illustrates examples of I/O request processing.

FIG. 5 is a block diagram that illustrates another example of I/O request processing performed by the storage controller 102. In this example, the storage controller 102 receives a write I/O request 250-1 with storage configuration attributes that require duplicated storage on HDDs with RAID level 6 protection, no caching, and non-atomic I/O operations. The storage controller 102 then determines whether the particular storage configuration presently exists within the storage volume 105. For example, metadata may be associated with a portion of the storage volume 105 that is already configured as desired. RAID firmware within the storage controller 102 would then maintain a mapping between a disk pool logical block address (LBA) and a backend LBA based on the metadata. Such a mapping table would also be able to identify redundant copies of data of an I/O request in the event there is a need for recovery. Thus, based on the storage configuration attributes of the write I/O request 250-1, the storage controller 102 can identify where this configuration is located in the storage volume 105 (e.g., in sub-volume 107-2). The storage controller 102 then calculates the RAID level 6 parity for the data 252-1 and stores the data 252-1 in the RAID level 6 sub-volume 107-2 of the storage volume 105. The metadata and mapping table can also be made persistent (e.g., via SSDs) to allow physical drives to be imported.

With the write I/O request 250-2, the storage controller 102 is directed to store the data 252-2 as a single copy in an SSD device with caching. In this example, only RAID level 1 protection is required with atomic I/O operations. The storage controller 102 searches its mapping table and determines that there is presently no such storage configuration within the storage volume 105. Accordingly, the storage controller 102 implements a RAID level 1 storage management from the SSD storage devices 106-1 and 106-2 to create a RAID level 1 storage sub-volume 107-1. Once created, the storage controller 102 directs the data 252-2 to the mirrored storage devices 106-1 and 106-2 and caches the write I/O request in the cache module 275.

Figure 6:
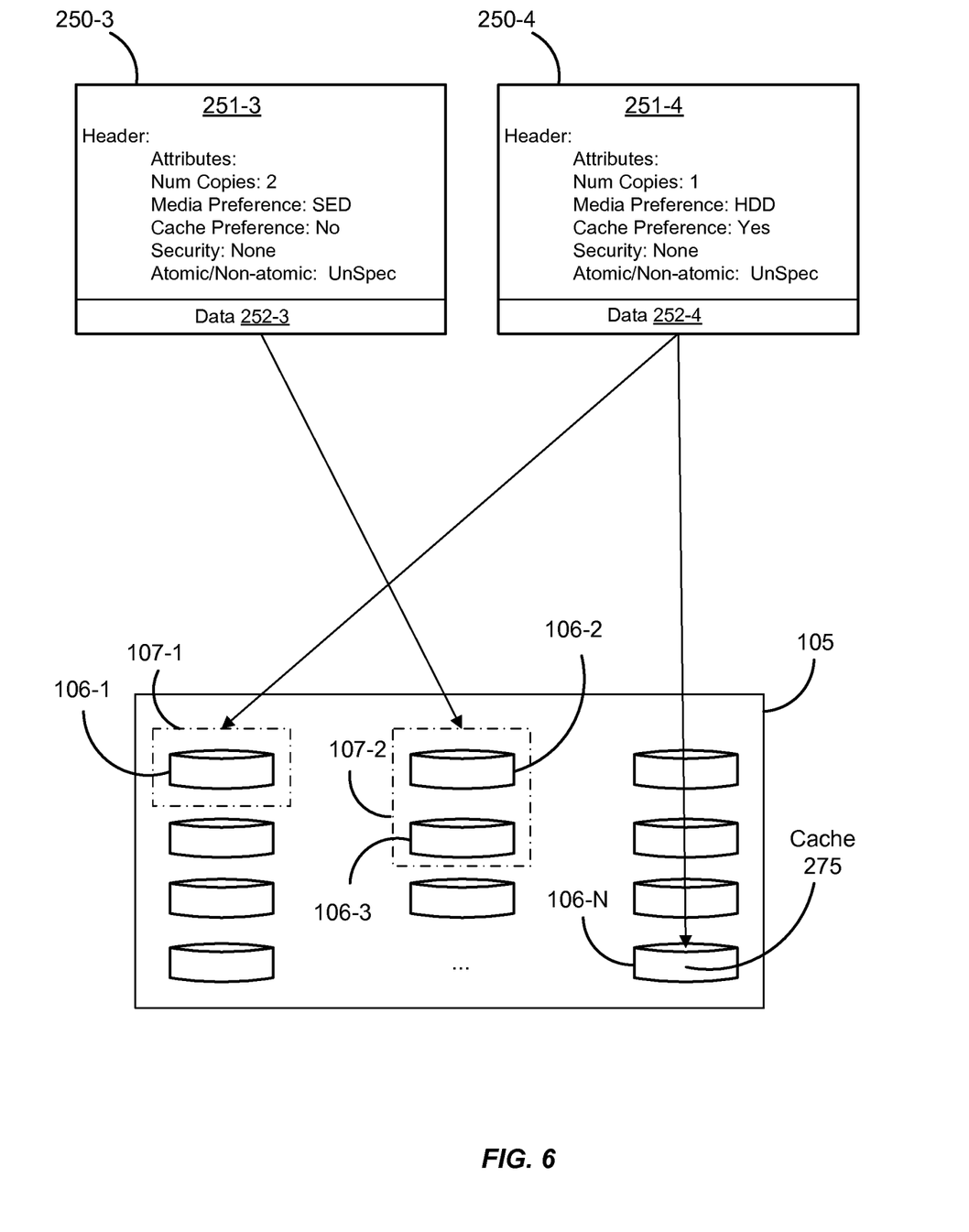

FIG. 6 is a block diagram that illustrates another example of I/O request processing performed by the storage controller 102. In this example, the storage controller 102 receives a write I/O request 250-3 with storage configuration attributes that require duplicated storage on SEDs, no RAID data protection, no caching, and unspecified atomic I/O operations. The storage controller 102 determines that the configuration does not exist on the storage volume 105 and therefore creates a sub volume 107-2 from the SEDs 106-2 and 106-3 therein and stores copies of the data 252-2 in each of those SEDs 106. Since the I/O request did not specify whether atomic I/O operations were to be performed, the storage controller 102 may simply assign that atomic operations are to not be performed for that particular I/O 250-3 configuration.

Thereafter, the storage controller 102 receives another I/O request 250-4 requesting a single copy of the data 252-4 to be stored on HDD with caching to be performed. Again, no RAID protection is desired and the atomic I/O operations are unspecified. The storage controller 102 again determines that this configuration does not exist in the storage volume 105 and configures a sub volume 107-1 from the HDD 106-1 in the storage volume 105 and stores the data 252-4 therewith. The storage controller 102 also caches the I/O request 250-4 with the storage device 106-N in the storage volume 105.

Again, the storage controller 102, having control over the storage configurations within the storage volume 105, may determine the manner in which caching and other I/O operations may be performed. For example, in I/O caching it is generally preferred that access to cached I/Os be relatively quick. Accordingly, the storage controller 102 may evaluate each of the storage devices 106 within the storage volume 105 and determine that one of the storage devices 106 (e.g., an SSD or a Dynamic Random Access Memory—"DRAM") has a much faster access speed than the remaining storage devices 106 within the storage by 105. Accordingly, the storage controller 102 may designate that storage device as the cache module 275 for the storage system.

In any case, the examples shown herein are not intended to limit the invention. Examples are merely intended to show that the storage controller 102 is operable to create storage configurations based on attributes of the I/Os 250. It should also be noted that, while certain attributes have been shown and described herein, the invention is not intended to be limited to the exemplary storage configuration attributes that are used to dynamically configure the storage volume 105. Other storage configuration attributes may be used to configure portions of the storage volume 105 according to storage sizes, implement read caching and/or write caching, and other advanced properties such as "read ahead" I/O operations.

Additionally, the embodiments shown and described herein provide certain advantages and distinctions over the prior art. For example, the storage controller 102 is operable to "thin provision" the storage space of the storage volume 105 making the storage configurations invisible to any particular host system 101 accessing the storage volume 105. The embodiments herein also enable OS/application layers of the host system 101 to specify data protection attributes per I/O request to facilitate improved control, performance, and maintenance.

Moreover, system administrators no longer need to create RAID volumes with specialized properties to suit the needs of differing I/O operations (e.g., users). This also avoids manual maintenance as there is no static storage topology. That is, the storage controller 102 assumes storage topology creation and control. And, as the storage configuration is flexibly controlled by the storage controller 102, unique background tasks can be deployed on portions of the storage volume based on priorities of I/O requests in the data thereof. Tiering and cache management applications can be also used to improve performance. And, as the storage configuration is implemented based on the I/O requests, the storage controller 102 can continue processing other I/Os. That is, the storage controller 102 is not required to bring a storage volume down for storage reconfiguration as the storage configurations can be performed on the fly from a single logical volume.

Moreover, as the storage controller 102 can handle generally all of the storage configuration tasks, the storage volume 105 can be scalably controlled by the storage controller 102. That is, since the storage controller 102 can present the storage volume 105 as a single volume of storage to the host system 101, storage capacity can be increased or decreased as desired with the addition or subtraction of storage devices 106. The storage controller 102 simply monitors the storage capacity of the storage volume and configures "virtual" volumes and the like based on the storage configuration attributes of the I/O requests.

Figure 7:
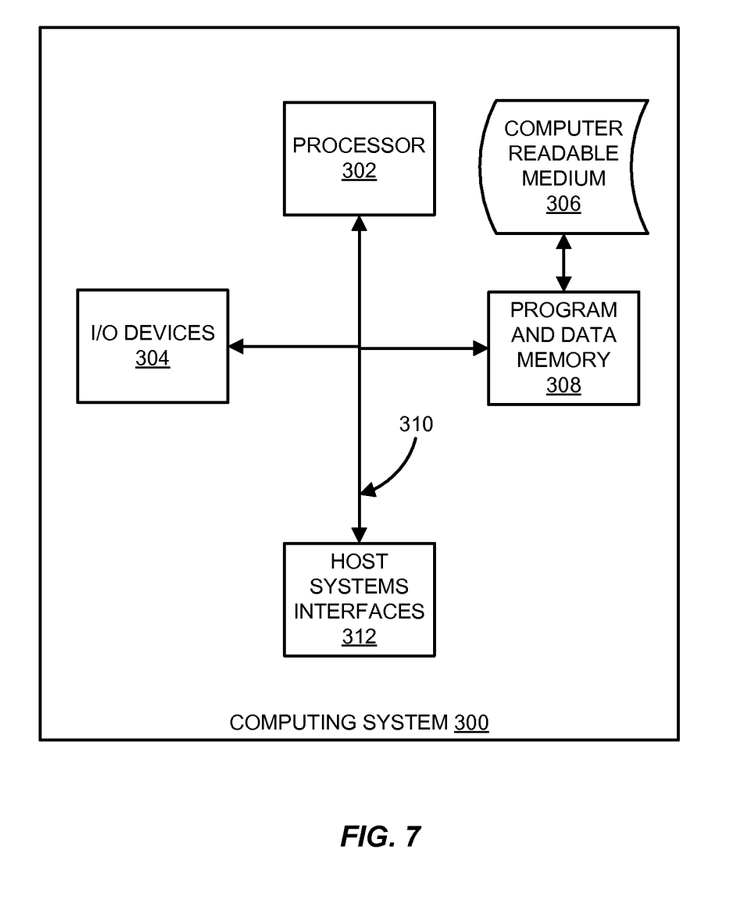
FIG. 7 illustrates an exemplary computer system operable to execute programmed instructions to perform desired functions described herein.

The invention can take the form of an entirely hardware embodiment, an entirely software embodiment or an embodiment containing both hardware and software elements. And, certain components may be configured to perform one or more of the operations disclosed herein. For example, the processor 104 may be operable to implement any or all of the features recited herein. In one embodiment, the invention is implemented in software, which includes but is not limited to firmware, resident software, microcode, etc. FIG. 7 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:

1. A storage controller operable to configure a storage volume from a plurality of storage devices, the storage controller comprising:
    an interface operable to receive a first write Input/Output (I/O) request from a host system, and to extract a storage configuration attribute from the first write I/O request; and
    a processor communicatively coupled to the interface and operable to identify a storage configuration required by the first write I/O request based on the storage configuration attribute, to determine whether the storage volume comprises the required storage configuration of the first write I/O request, and to configure a portion of the storage volume according to the storage configuration required by the first write I/O request in response to a determination that the storage volume does not comprise the required storage configuration, wherein the required storage configuration indicates a level of data protection desired for the first write I/O request,
    wherein the processor is further operable to maintain a mapping between a disk pool logical block address (LBA) and a backend LBA based on metadata that is associated with the storage configuration of the storage volume, and
    wherein the processor is further operable to access the mapping to determine whether the storage volume comprises the required storage configuration of the first write I/O request.

2. The storage controller of claim 1, wherein:
    the interface is further operable to receive a second write I/O request from the host system, and to extract a storage configuration attribute from the second write I/O request; and
    the processor is further operable to identify a storage configuration required by the second write I/O request based on the storage configuration attribute in the second write I/O request, to determine whether the storage volume comprises the required storage configuration of the second write I/O request, and to direct the second write I/O request to the configured portion of the storage volume based on the determination.

3. The storage controller of claim 1, wherein:
the storage controller further comprises a cache memory; and
the processor is further operable to determine whether the first write I/O request requires caching based on the storage configuration attribute, and to cache the first write I/O request based on the determination.

4. The storage controller of claim 1, wherein:
the level of data protection comprises a Redundant Array of Independent Disks (RAID) storage management level.

5. The storage controller of claim 4, wherein:
the interface is further operable to receive a second write I/O request from the host system, and to extract a storage configuration attribute from the second write I/O request; and
the processor is further operable to identify a storage configuration required by the second write I/O request based on the storage configuration attribute in the second write I/O request, to determine whether the storage volume comprises the RAID storage management level required by the second write I/O request, and to configure the RAID storage management level required by the second write I/O request in another portion of the storage volume based on the determination.

6. The storage controller of claim 4, wherein:
the plurality of storage devices comprises a Solid State Drive (SSD) or the SSD and at least one of a Hard Disk Drive and, a Secure Enabled Drive;
the RAID level storage management level is one of RAID 0, RAID 1, RAID 2, RAID 3, RAID 4, RAID 5, and RAID 6, and
if the required storage configuration of the first write I/O request requires a high speed write access, the processor configures the SSD for storage of the first write I/O request and directs the first write I/O request to the SSD drive according to the required storage configuration.

7. A method operable in a storage controller, the method comprising:
configuring a storage volume from a plurality of storage devices;
receiving a first write Input/Output (I/O) request from a host system;
extracting a storage configuration attribute from the first write I/O request;
identifying a storage configuration required by the first write I/O request based on the storage configuration attribute;
determining whether the storage volume comprises the required storage configuration of the first write I/O request; and
configuring a portion of the storage volume according to the storage configuration required by the first write I/O request in response to a determination that the storage volume does not comprise the required storage configuration, wherein the required storage configuration indicates a level of data protection desired for the first write I/O request,
wherein a mapping between a disk pool logical block address (LBA) and a backend LBA is maintained based on metadata that is associated with the storage configuration of the storage volume, and
wherein the mapping is accessed in determining whether the storage volume comprises the required storage configuration of the first write I/O request.

8. The method of claim 7, wherein:
the plurality of storage devices comprises a Solid State Drive (SSD) or the SSD and at least one of a Hard Disk Drive and a Secure Enabled Drive; and
if the required storage configuration of the first write I/O request requires a high speed write access, the method further comprises:
configuring the SSD for storage of the first write I/O request; and
directing the first write I/O request to the SSD drive according to the required storage configuration.

9. The method of claim 7, further comprising:
receiving a second write I/O request from the host system;
extracting a storage configuration attribute from the second write I/O request;
identifying a storage configuration required by the second write I/O request based on the storage configuration attribute in the second write I/O request;
determining whether the storage volume comprises the required storage configuration of the second write I/O request; and
directing the second write I/O request to the configured portion of the storage volume based on the determination, wherein the required storage configuration of the second write I/O request indicates a level of data protection desired for the second write I/O request.

10. The method of claim 7, wherein:
the storage controller comprises a cache memory; and
the method further comprises:
determining whether the first write I/O request requires caching based on the storage configuration attribute;
caching the first write I/O request based on the determination.

11. The method of claim 7, wherein:
the storage controller comprises a local memory; and
the method further comprises generating a map of the first write I/O request according to the storage configuration attribute for subsequent read I/O requests and subsequent write I/O requests to the same configured portion of the storage volume.

12. The method of claim 7, wherein:
level of data protection comprises a Redundant Array of Independent Disks (RAID) storage management level.

13. The method of claim 12, further comprising:
receiving a second write I/O request from the host system;
extracting a storage configuration attribute from the second write I/O request;
identifying a storage configuration required by the second write I/O request based on the storage configuration attribute in the second write I/O request;
determining whether the storage volume comprises the RAID storage management level required by the second write I/O request; and
configuring the RAID storage management level required by the second write I/O request in another portion of the storage volume based on the determination.

14. A non-transitory computer readable medium comprising instructions that, when directed by a processor of a storage controller, direct the processor to:
configure a storage volume from a plurality of storage devices;
receive a first write Input/Output (I/O) request from a host system;
extract a storage configuration attribute from the first write I/O request;
identify a storage configuration required by the first write I/O request based on the storage configuration attribute;

determine whether the storage volume comprises the required storage configuration of the first write I/O request; and configure a portion of the storage volume according to the storage configuration required by the first write I/O request in response to a determination that the storage volume does not comprise the required storage configuration, wherein the required storage configuration indicates a level of data protection desired for the first write I/O request, wherein the processor maintains a mapping between a disk pool logical block address (LBA) and a backend LBA based on metadata that is associated with the storage configuration of the storage volume, and wherein the processor accesses the mapping to determine whether the storage volume comprises the required storage configuration of the first write I/O request.

15. The computer readable medium of claim 14, wherein:

the plurality of storage devices comprises a Solid State Drive (SSD) or the SSD and at least one of a Hard Disk Drive and a Secure Enabled Drive; and if the required storage configuration of the first write I/O request requires a high speed write access, the computer readable medium further comprises instructions that direct the processor to:
  configure the SSD for storage of the first write I/O request; and
  direct the first write I/O request to the SSD drive according to the required storage configuration.

16. The computer readable medium of claim 14, wherein:

the level of data protection comprises a Redundant Array of Independent Disk (RAID) storage management level.

17. The computer readable medium of claim 16, further comprising instructions that direct the processor to:

receive a second write I/O request from the host system;

extract a storage configuration attribute from the second write I/O request;

identify a storage configuration required by the second write I/O request based on the storage configuration attribute in the second write I/O request;

determine whether the storage volume comprises the RAID storage management level required by the second write I/O request; and configure the RAID storage management level required by the second write I/O request in another portion of the storage volume based on the determination.

18. A storage controller operable to present a plurality of storage devices as a storage volume to a host system, the storage controller comprising:

an interface operable to receive a write I/O request from the host system to the storage volume; and a processor operable to identify, based on a storage configuration attribute in the write I/O request, a storage configuration required by the write I/O request, to determine whether the identified storage configuration resides in a storage volume configured from a plurality of storage devices coupled to the storage controller, to determine that the identified storage configuration does not reside in the storage volume, to apportion a number of the storage devices in the storage volume according to the identified storage configuration of the write I/O request, and to process the write I/O request to the apportioned storage devices, wherein the identified storage configuration indicates a redundant array of independent disks (RAID) level of data protection desired for the write I/O request, wherein the processor maintains a mapping between a disk pool logical block address (LBA) and a backend LBA based on metadata that is associated with one or more storage configurations of the storage volume, and wherein the processor accesses the mapping to determine whether the storage volume comprises the identified storage configuration of the write I/O request.

19. The storage controller of claim 18, further comprising:

a cache module;

wherein the processor is further operable to determine that the write I/O request requires caching, and to cache the write I/O request in the cache module.

20. The storage controller of claim 18, wherein:

the plurality of storage devices comprises Hard Disk Drives, Solid State Drives, Secure Enabled Drives, and combinations thereof.

* * * * *